(12) United States Patent
Seto (10) Patent No.: US 8,443,872 B2
(45) Date of Patent: May 21, 2013

(54) HEAT EXCHANGER FOR VEHICULAR AIR CONDITIONING APPARATUS

(75) Inventor: Takahiro Seto, Utsunomiya (JP)

(73) Assignee: Keihin Corporation, Tokyo (JP)

( * ) Notice: Subject to any disclaimer, the term of this patent is extended or adjusted under 35 U.S.C. 154(b) by 829 days.

(21) Appl. No.: 12/569,149

(22) Filed: Sep. 29, 2009

(65) Prior Publication Data

US 2011/0073273 A1 Mar. 31, 2011

(51) Int. Cl.
*B60H 1/00* (2006.01)
*B60H 3/00* (2006.01)
*B60H 1/32* (2006.01)
*F28F 13/18* (2006.01)
*F28F 13/00* (2006.01)
*F28F 9/00* (2006.01)
*F24H 3/06* (2006.01)
*F28D 7/10* (2006.01)
*F28D 1/02* (2006.01)
*F25B 41/00* (2006.01)

(52) U.S. Cl.
USPC .......... 165/202; 165/41; 165/42; 165/43; 165/44; 165/131; 165/135; 165/122; 165/140; 165/153; 165/162; 165/163; 62/203; 62/239; 62/244

(58) Field of Classification Search
USPC ............ 165/41–44, 151, 135, 140, 131, 122, 165/162, 163, 153, 202; 62/239, 244, 203
See application file for complete search history.

(56) References Cited

U.S. PATENT DOCUMENTS

| 5,309,731 | A | 5/1994 | Nonoyama et al. | |
| 6,308,770 | B1 * | 10/2001 | Shikata et al. | 165/42 |
| 7,096,932 | B2 * | 8/2006 | Scoville et al. | 165/140 |
| 2003/0041610 | A1 * | 3/2003 | Shirota et al. | 62/244 |

FOREIGN PATENT DOCUMENTS

| JP | 9-104216 | 4/1997 |
| JP | 09207543 | * 12/1997 |

* cited by examiner

*Primary Examiner* — Frantz F. Jules
*Assistant Examiner* — Erik Mendoza-Wilkenfel
(74) *Attorney, Agent, or Firm* — Rankin, Hill & Clark LLP (57) ABSTRACT

In an evaporator that constitutes part of a vehicular air conditioning apparatus, first fins having louvers therein are arranged between first and second tubes. Together therewith, a second fin, which does not have any louvers therein, is provided at a boundary portion between a first cooling section, which faces toward a first front passage through which air from a first blower unit flows, and a second cooling section, which faces toward a first rear passage through which air from a second blower unit flows. In addition, air is supplied to the interior of a casing from the first blower unit and is cooled by the first cooling section, which is partitioned by the second fin, whereas air supplied from the second blower unit passes through the second cooling section, which is partitioned from the first cooling section by the second fin.

10 Claims, 7 Drawing Sheets

HEAT EXCHANGER FOR VEHICULAR AIR CONDITIONING APPARATUS

BACKGROUND OF THE INVENTION

1. Field of the Invention

The present invention relates to a heat exchanger, which is installed in a vehicular air conditioning apparatus that performs temperature adjustment of a vehicle compartment, whereby the heat exchanger is used by the vehicular air conditioning apparatus for cooling and heating of air that is blown into the vehicle compartment.

2. Description of the Related Art

In a vehicular air conditioning apparatus that is mounted in a vehicle, internal and external air is drawn into a casing by a blower, and after cooled air, which has been cooled by a heat exchanger that forms a cooling means, and heated air, which has been heated by a heat exchanger that forms a heating means, are mixed together in the casing at a predetermined mixing ratio, the mixed air is blown out from defroster blow-out ports, face blowout ports, or foot blowout ports arranged in the vehicle compartment, whereby adjustment of temperature and humidity in the vehicle compartment is carried out. With this type of vehicular air conditioning apparatus, for example, a plurality of ventilation passages through which air flows are included inside the casing, whereby air that flows through certain ones of the ventilation passages is blown out toward the foot blowout ports, whereas air that flows through other of the ventilation passages is blown out toward the defroster blow-out ports and/or the face blow-out ports.

In a vehicular air conditioning apparatus such as described above, for example, as disclosed in Japanese Laid-Open Patent Publication No. 09-104216, so as to correspond respectively with the ventilation passages, partition panels are provided on upstream and downstream sides of the heat exchanger, respectively, so that one and the other of the ventilation passages are separated from each other by the partition panels. Together therewith, by arranging a partition panel in alignment with any one of a plurality of tubes that make up the heat exchanger, airflows that flow respectively through one of the ventilation passages and the other of the ventilation passages are separated from each other inside the heat exchanger.

Notwithstanding, with the aforementioned conventional technique, for example, in the case of being applied to a heat exchanger that includes two layers of tubes, inside the heat exchanger, air tends to pass and flow in an intermingling manner between one set of tubes provided on the front surface side of the heat exchanger and the other set of tubes provided on the rear surface side of the heat exchanger.

Therefore, with a heat exchanger having such a two-layered arrangement of tubes, air which flows through one or the other of the ventilation passages and flows into the heat exchanger tends to flow from a passage in which the air flow rate is abundant, and which is high in pressure, toward the side of a passage in which the air flow rate is smaller and which has a relatively low pressure. As a result, the air inside each of the passages on the downstream side of the heat exchanger does not obtain desired airflow rates, so that ultimately, the mixing ratio between cool air and warm air becomes altered. Also, the air, which is blown out from each of the blow-out ports inside the vehicle compartment, is not capable of achieving a desired temperature and blowing rate.

Further, when the flow of air inside either one of the first or second passage is stopped, air flowing through one of the ventilation passages passes through the interior of the heat exchanger and flows into the other ventilation passage, and such air is blown out into the vehicle compartment. More specifically, blowing out of air continues to be performed unintentionally even from blow-out ports inside the vehicle compartment for which blowing of air has been stopped, thereby imparting a sense of discomfort to passengers in the vehicle compartment.

SUMMARY OF THE INVENTION

A general object of the present invention is to provide a heat exchanger for use in a vehicular air conditioning apparatus, which is capable of enhancing the comfort of passengers inside the vehicle compartment by reliably blowing out air, which is supplied to first and second passages in a heat exchanger having a two-layered arrangement of tubes, respectively and independently into the vehicle compartment from desired blow-out ports.

The present invention is characterized by a heat exchanger for use in a vehicular air conditioning apparatus having a casing including a plurality of passages therein through which air flows, and a damper mechanism for switching a flow state of air in the passages, wherein the heat exchanger is disposed in the interior of the casing and performs temperature adjustment by carrying out heat exchange on the air, the heat exchanger comprising:

a plurality of first and second tubes, which are disposed in parallel along a direction of flow of the air that flows through the interior of the casing, and through which a medium flows through the interior thereof;

first fins disposed between the first and second tubes the first fins being bent in an undulating shape and having air holes therein through which the air flows; and a partitioning means which is arranged along a direction in which the first and second tubes extend respectively, between the first and second tubes, the partitioning means effecting separation between a first heat exchange section and a second heat exchange section in the heat exchanger, the first heat exchange section carrying out heat exchange on the air that flows through a first passage of the casing, and the second heat exchange section carrying out heat exchange on the air that flows through a second passage of the casing, wherein the partitioning means is disposed at a boundary portion between the first heat exchange section and the second heat exchange section, and is made up from a second fin that does not include air holes therein.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
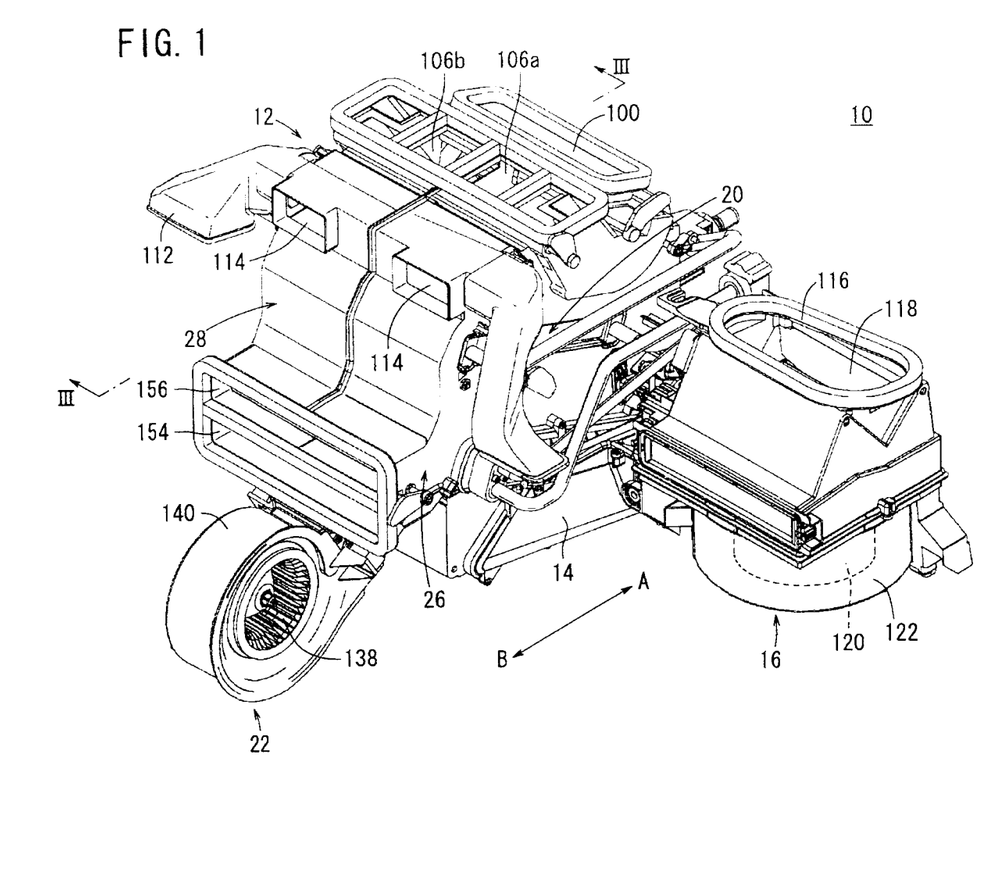
FIG. 1 is an external perspective view of a vehicular air conditioning apparatus according to an embodiment of the present invention.

A preferred embodiment concerning a heat exchanger for use in a vehicular air conditioning apparatus according to the present invention shall be explained in detail below with reference to the accompanying drawings. In FIG. 1, reference numeral 10 indicates a vehicular air conditioning apparatus according to an embodiment of the present invention. The vehicular air conditioning apparatus 10, for example, is installed in a vehicle having three rows of seats arranged along the direction of travel of the vehicle. In the following descriptions, the first row of seats in the vehicle compartment of the vehicle is designated as front seats, the second row of seats is designated as middle seats, and the third row of seats is designated as rear seats.

Figure 2:
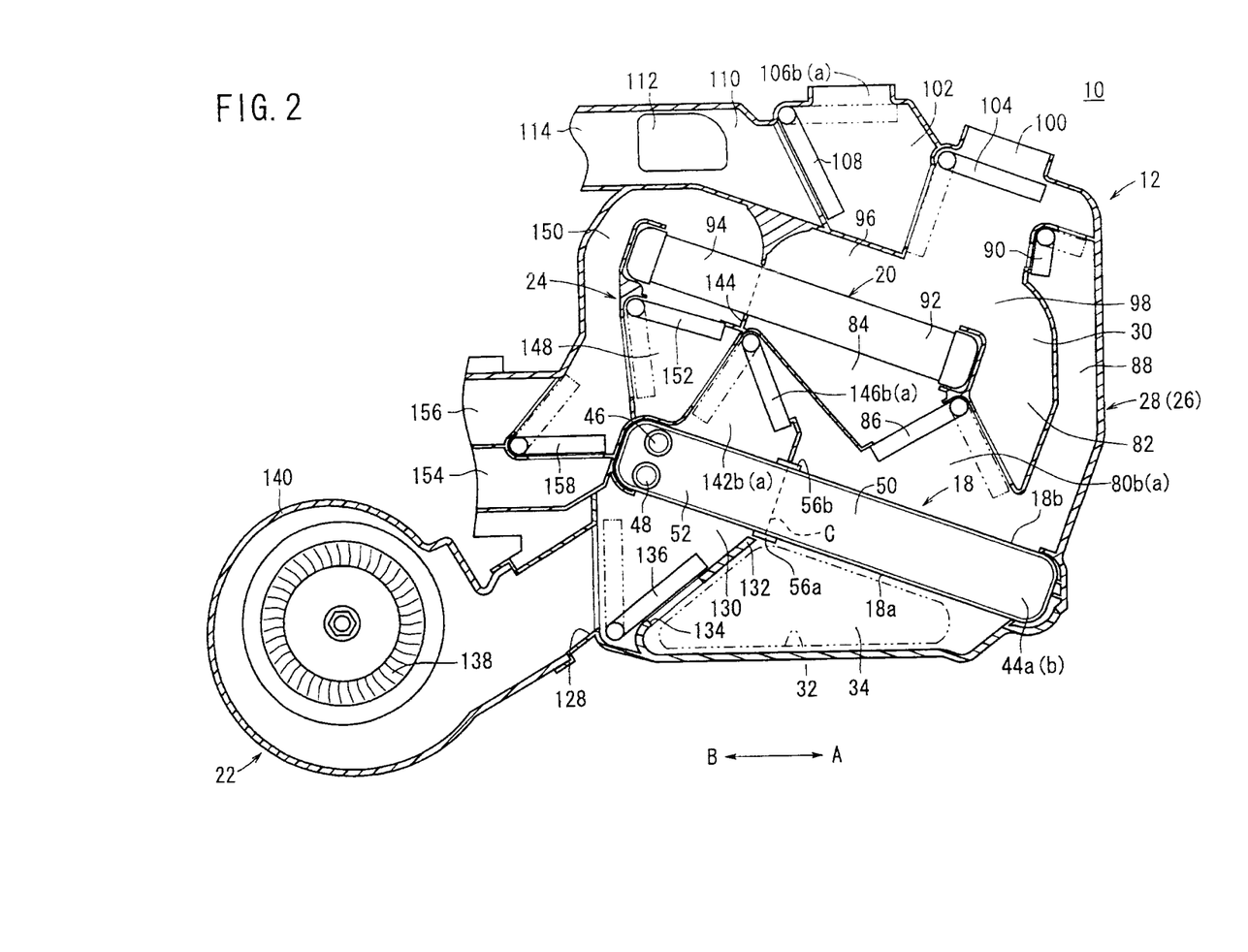
FIG. 2 is an overall cross sectional view of the vehicular air conditioning apparatus shown in FIG. 1.

Further, the vehicular air conditioning apparatus 10 is installed so that the right-hand side thereof shown in FIG. 2 (in the direction of arrow A) is oriented toward the front side of the vehicle, whereas the left-hand side (in the direction of arrow B) is oriented toward the rear side of the vehicle. The arrow A direction shall be described as a forward direction, whereas the arrow B direction shall be described as a rearward direction.

In the present embodiment, inside the casing 12, plural rotating members made up of dampers or the like are provided, wherein the rotating members are operated by rotational drive sources such as motors or the like. For purposes of simplification, depictions and explanations concerning such rotational drive sources have been omitted.

Figure 3:
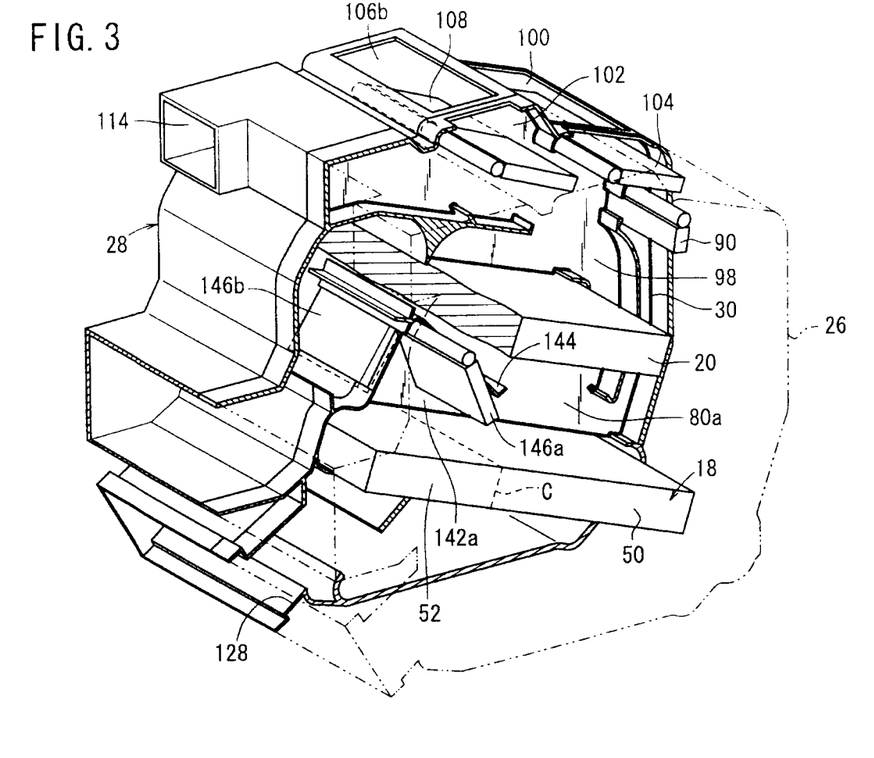
FIG. 3 is a cross sectional perspective view taken along line III-III of FIG. 1.

As shown in FIGS. 1 through 3, the vehicular air conditioning apparatus 10 includes a casing 12 constituted by respective air passages, a first blower unit 16 connected through a connection duct 14 to a side portion of the casing 12 for blowing air toward the front seat side of the vehicle, an evaporator (heat exchanger) 18 arranged inside the casing 12 for cooling air, a heater core (heat exchanger) 20 for heating air, a second blower unit 22 connected to a lower portion of the casing 12 for taking in air from inside the vehicle compartment (interior air) and blowing the air toward the rear seats of the vehicle, and a damper mechanism 24 for switching the flow of air that flows through and inside each of the respective passages.

The casing 12 is constituted by first and second divided casings 26, 28 having substantially symmetrical shapes, wherein a center plate 30 is disposed between the first divided casing 26 and the second divided casing 28. The connection duct 14 is connected on a lower side portion of the first divided casing 26, and a first intake port 32 is formed through which air is supplied from the first blower unit 16. The first intake port 32 communicates with a first front passage (first passage) 34 disposed on an upstream side of the evaporator 18.

The evaporator 18 is disposed so as to straddle between the first divided casing 26 and the second divided casing 28. One end of the evaporator 18 in the forward direction (the direction of arrow A) of the vehicle is inclined downward at a predetermined angle with respect to the other end thereof in the rearward direction of the vehicle.

Figure 4:
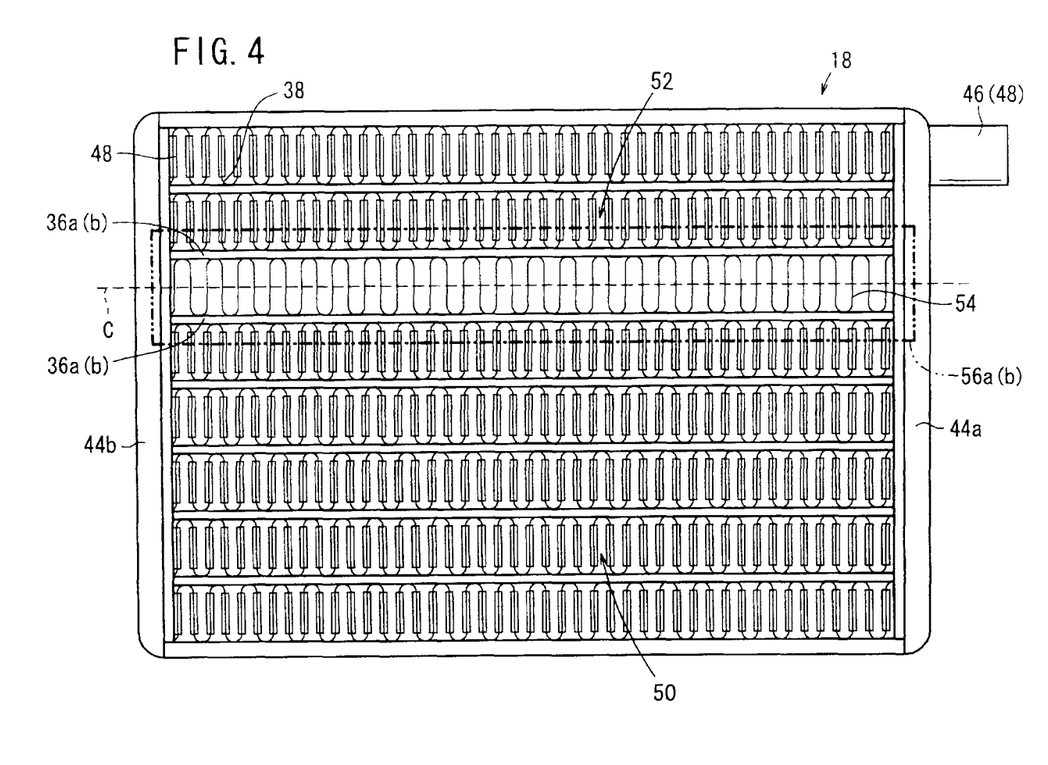
FIG. 4 is an overall plan view of an evaporator shown in FIG. 2.
Figure 5:
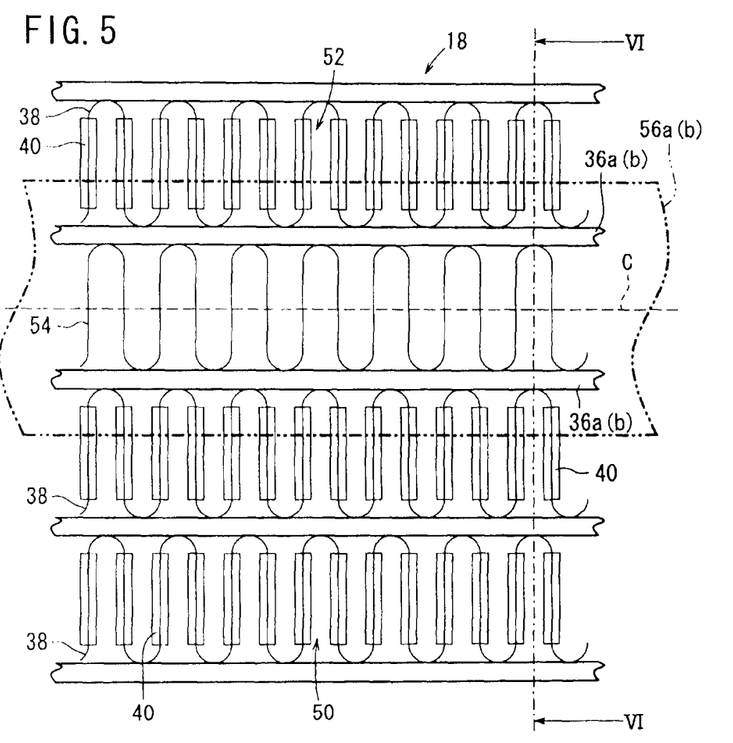
FIG. 5 is an enlarged plan view showing the vicinity of a boundary portion between a first cooling section and a second cooling section in the evaporator of FIG. 4.
Figure 6:
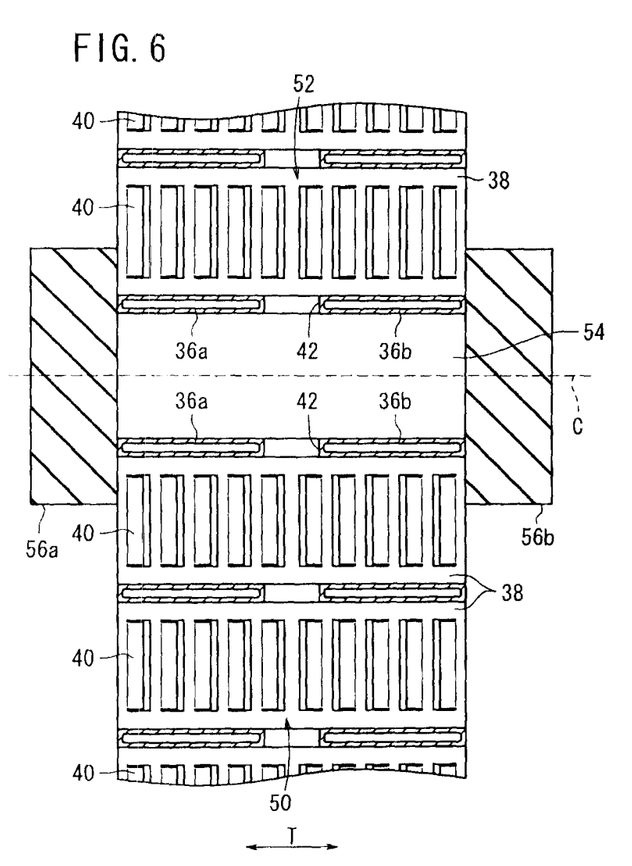
FIG. 6 is a cross sectional view taken along line VI-VI of FIG. 5.

As shown in FIGS. 4 to 6, in the evaporator 18, for example, paired first and second tubes 36a, 36b are formed from thin plates of aluminum or the like, and first fins 38, which are folded in a serpentine-like undulating (wavy) shape, are disposed respectively between the stacked first and second tubes 36a, 36b. On the first fins 38, a plurality of louvers 40 are formed, which are cut out so as to be inclined at predetermined angles with respect to the planar surface of the first fins 38. By causing a coolant medium to flow through the interior of the first and second tubes 36a, 36b, air that passes through the louvers 40 and flows between the first fins 38 is cooled by the coolant medium and is supplied to the downstream side as chilled air.

As shown in FIG. 6, the paired first and second tubes 36a, 36b are arrayed in parallel and arranged in two layers in the thickness direction T of the evaporator 18. A gap 42 of a predetermined interval is disposed between the first tubes 36a and the second tubes 36b.

Further, in the evaporator 18 on both ends of the first and second tubes 36a, 36b, respective hollow tank portions 44a, 44b are connected, which retain a coolant medium that flows inside the first and second tubes 36a, 36b. In addition, on one of the tank portions 44a, a supply conduit 46 through which the coolant medium is supplied from the exterior, and a discharge conduit 48 through which the coolant medium having circulated through the interior of the evaporator 18 is discharged, are connected respectively (see FIG. 4).

Furthermore, as shown in FIG. 2, the evaporator 18 includes a first cooling section 50, which faces the first front passage 34 and cools air supplied from the first blower unit 16, and a second cooling section 52, which faces a later described first rear passage (second passage) 130 and cools air supplied from the second blower unit 22. The first cooling section 50 is arranged forwardly (in the direction of the arrow A) of the casing 12, whereas the second cooling section 52 is arranged rearwardly (in the direction of the arrow B) of the casing 12.

As shown in FIGS. 4 through 6, a second fin 54, which blocks communication of air between the first cooling section 50 and the second cooling section 52, is disposed at a boundary portion C of the first cooling section 50 and the second cooling section 52. The second fin 54, similar to the first fins 38, is formed in a serpentine-like undulating (wavy) shape, and is provided on the evaporator 18 in the vicinity of the boundary portion C of the first cooling section 50 and the second cooling section 52, while being disposed between the pairs of first and second tubes 36a, 36b, which are adjacent to each other. More specifically, the second fin 54 is formed with a thickness dimension that extends from a surface 18a of the evaporator 18 to another surface 18b side thereof, and the second fin 54 abuts against the sides of the first tubes 36a and the second tubes 36b (see FIG. 6).

Further, because the louvers 40, which are formed in the first fins 38, are not formed in the second fin 54, flow of air between the adjacent undulating regions is blocked, so that the air cannot flow therethrough, along the direction in which the first and second tubes 36a, 36b extend.

More specifically, the second fin 54 is arranged in the evaporator 18 in parallel with the boundary portion C of the first cooling section 50 and the second cooling section 52. Stated otherwise, the boundary portion C of the first cooling section 50 and the second cooling section 52 is set in parallel with the first and second tubes 36a, 36b, which are disposed on both sides of the second fin 54.

Further, as shown in FIG. 6, on the evaporator 18, a pair of sealing members 56a, 56b are attached respectively to the surfaces 18a, 18b thereof that face respectively toward the second fin 54, and toward the first front passage 34 and the first rear passage 130. The sealing members 56a, 56b are formed, for example, from rubber or a resin material, and are disposed so as to cover the second fin 54 and the pair of first and second tubes 36a, 36b that are disposed on both side portions of the second fin 54, and further to extend from one of the tank portions 44a to the other tank portion 44b. In addition, the seal members 56a, 56b, by being attached respectively to the surfaces 18a, 18b of the evaporator 18, serve to block the flow of air passing through the interior of the evaporator 18 and which flows from the second fin 54 toward the sides of the surfaces 18a, 18b.

On the other hand, as shown in FIGS. 1 to 3, on the downstream side of the evaporator 18, second front passages 80a, 80b are formed, through which air having passed through the first cooling section 50 is supplied. Upwardly of the second front passages 80a, 80b, a third front passage 82 and a fourth front passage 84 are formed in a branching or bifurcated manner. Further, in the second front passages 80a, 80b, a first air mixing damper 86 is rotatably disposed so as to face toward the branching portion of the third front passage 82 and the fourth front passage 84. Additionally, by rotation of the first air mixing damper 86, the blowing condition and blowing rate of cooled air that has passed through the evaporator 18 into the third front passage 82 and the fourth front passage 84 is adjusted. The third front passage 82 is arranged on the forward side (in the direction of arrow A), whereas the fourth front passage 84 is arranged on the rearward side (in the direction of arrow B) of the casing 12. The heater core 20 is disposed on a downstream side of the fourth front passage 84.

Further, on the forward side (in the direction of arrow A) of the third front passage 82, a bypass passage 88 is formed, which extends along the third front passage 82 and supplies air to a later-described mixing section 98 from the downstream side of the evaporator 18, and a bypass damper 90 is disposed on a downstream side of the bypass passage 88. The bypass passage 88 is provided to supply cool air cooled by the evaporator 18 directly to the downstream side under a switching action of the bypass damper 90.

The heater core 20, similar to the evaporator 18, is disposed so as to straddle between the first divided casing 26 and the second divided casing 28. One end of the heater core 20 in the forward direction (the direction of arrow A) of the vehicle is inclined downward at a predetermined angle with respect to the other end thereof in the rearward direction (the direction of arrow B) of the vehicle. The heater core 20 includes a first heating section 92, which faces the fourth front passage 84 and heats air supplied from the fourth front passage 84, and a second heating section 94, which faces the later described third rear passage 148 and heats air supplied from the third rear passage 148.

On the downstream side of the heater core 20, a fifth front passage 96 is formed. The fifth front passage 96 extends in the forward direction, and at a location that merges with the downstream side of the third front passage 82, the mixing section 98 is formed, in which cooled air supplied through the third front passage 82 and warm air supplied through the fifth front passage 96 are mixed. A defroster blow-out port 100 opens upwardly of the mixing section 98, and to the side of the mixing section 98, a rearwardly extending sixth front passage 102 is formed.

Further, in the mixing section 98, a defroster damper 104 is rotatably disposed, facing the defroster blow-out port 100. By rotation of the defroster damper 104, the blowing state of air into the defroster blow-out port 100 and the sixth front passage 102 is switched, and the blowing rate thereof is adjusted.

In the sixth front passage 102, a first vent blow-out ports 106a, 106b open upwardly, and a vent damper 108 is rotatably disposed facing toward the first vent blow-out ports 106a, 106b, and communicating with a seventh front passage 110, which extends further rearwardly. By rotation of the vent damper 108, the blowing state of air from the mixing section 98 is switched to the first vent blow-out ports 106a, 106b and the seventh front passage 110, and further, the blowing rate of the air is capable of being adjusted.

The defroster blow-out port 100 and the first vent blow-out ports 106a, 106b open respectively upwardly of the casing 12. The defroster blow-out port 100 is arranged on a forward side (in the direction of arrow A), whereas the first vent blow-out ports 106a, 106b are arranged on the rearward side (in the direction of arrow B), substantially centrally in the casing 12 with respect to the defroster blow-out port 100.

On a downstream side of the seventh front passage 110, a first heat passage 112 is connected, which extends in the widthwise direction of the casing 12 and blows air through a non-illustrated first heat blow-out port in the vicinity of the feet of passengers in the front seats in the vehicle compartment. Together therewith, a second heat passage 114 is connected, which extends rearwardly of the casing 12 and blows air through a second heat blow-out port (not shown) in the vicinity of the feet of passengers in the middle seats inside the vehicle compartment.

The first blower unit 16 includes an intake damper 118 in which a duct 116 for introducing external air is disposed in an inlet opening thereof, for carrying out switching of internal and external air, and a first blower fan 120 for supplying to the interior of the casing 12 air (external air or internal air) that is taken in from the duct 116 or the like. A blower case 122 in which the first blower fan 120 is accommodated communicates with the interior of the casing 12 via the connection duct 14 connected to the first intake port 32. The rotation of the first blower fan 120 is controlled by a first blower motor 121, which is driven by supplying electrical power thereto.

In this manner, air supplied from the first blower unit 16 is introduced to the interior of the casing 12 through the connection duct 14 and the first intake port 32, and by rotating actions of the first air mixing damper 86, the defroster damper 104, the vent damper 108 and the bypass damper 90, which collectively make up the damper mechanism 24, air is selectively supplied through the first through seventh front passages 74, 80a, 80b, 82, 84, 96, 102, 110, and the bypass passage 88 into the defroster blow-out port 100, the first vent blow-out ports 106a, 106b and the first and second heat passages 112, 114, which are capable of blowing air to the front and middle seats in the vehicle.

On the other hand, on a lower portion of the casing 12, a second intake port 128 through which air is supplied from the second blower unit 22 is formed on a rearward side (in the direction of arrow B) perpendicular to the first intake port 32. The second intake port 128 opens at a position on an upstream side of the evaporator 18 and communicates with the first rear passage 130.

The first rear passage 130 is separated from the first front passage 34 by a first dividing wall 132, and a rotatable ventilation-switching damper (switching damper) 136 is provided between a communication opening 134 formed in the first dividing wall 132 and the second intake port 128. In addition, in the case that a mode is selected in which blowing of air from the second blower unit 22 is halted and blowing of air only from the first blower unit 16 is carried out, by blocking the second intake port 128 by the ventilation-switching damper 136 (i.e., the state shown by the two-dot-dash line in FIG. 2), back flowing of air into the second blower unit 22 can be prevented when a portion of the air supplied from the first blower unit 16 passes through the interior of the evaporator 18 and the heater core 20 and is leaked out to the side of the first through fourth rear passages 130, 142a, 142b, 148, 150.

Figure 7:
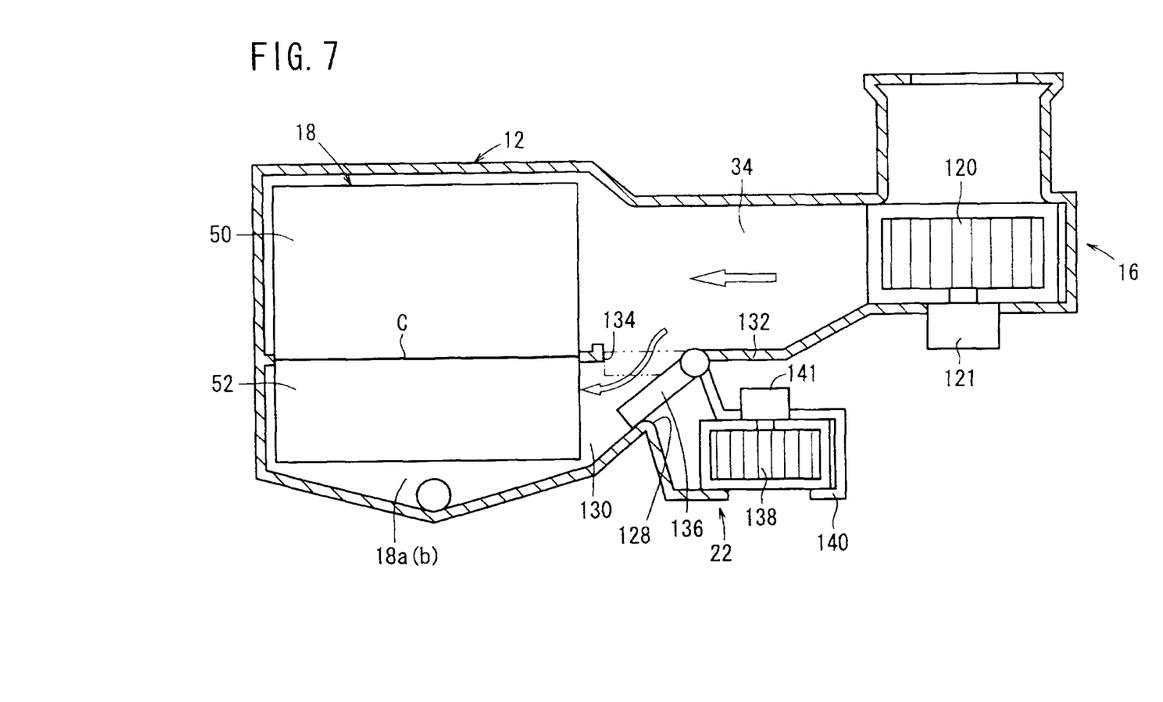
FIG. 7 is an outline structural view showing a casing, first and second blower units, and an evaporator, which constitute the vehicular air conditioning apparatus of FIG. 1.

In this case, as shown in FIG. 7, by rotating the ventilation-switching damper 136 to the side of the second intake port 128 and opening the communication opening 134, a portion of the air supplied to the first front passage 34 can be supplied to the side of the first rear passage 130.

The second blower unit 22 includes a second blower fan 138 that takes in air (internal air) from the vehicle compartment and supplies the intake air to the interior of the casing 12. A blower case 140 in which the second blower fan 138 is accommodated is connected to the second intake port 128 of the casing 12 and communicates with the first rear passage 130. The rotation of the second blower fan 138, similar to the first blower fan 120, is controlled by a second blower motor 141, which is driven by supplying electrical power thereto.

On a downstream side of the first rear passage 130, second rear passages 142a, 142b are formed to which air that has passed through the second cooling section 52 of the evaporator 18 is supplied. The second rear passages 142a, 142b are separated from the second front passages 80a, 80b by a second dividing wall 144, and the second dividing wall 144 extends to the evaporator 18. Owing thereto, on a downstream side of the evaporator 18, air that has passed through the first rear passage 130 and flows to the second cooling section 52 of the evaporator 18 does not intermix mutually with air that has passed through the first front passage 34 and flows to the first cooling section 50 of the evaporator 18.

Herein, as shown in FIG. 3, the second rear passages 142a, 142b, the second front passages 80a, 80b and the first vent blow-out ports 106a, 106b are separated respectively on sides of the first and second divided casings 26, 28 about the center plate 30, which is disposed in the center of the casing 12, thereby forming the second rear passage 142a and the second rear passage 142b, the second front passage 80a and the second front passage 80b, and the first vent blow-out port 106a and the first vent blow-out port 106b. Furthermore, a pair of communication switching dampers 146a, 146b, which are capable of switching a communication state between the second rear passage 142a and the second front passage 80a, and between the second rear passage 142b and the second front passage 80b, are disposed in the second rear passage 142a and the second rear passage 142b, respectively, wherein one of the communication switching dampers 146a and the other of the communication switching dampers 146b are rotatably controlled separately and independently from each other.

In addition, by rotation of the pair of communication switching dampers 146a, 146b, the second rear passages 142a, 142b for blowing air to the middle seats and rear seats in the vehicle compartment are placed in communication mutually with the second front passages 80a, 80b for blowing air to the front seats in the vehicle compartment. For example, by changing the rotation amount of one of the communication switching dampers 146a and the rotation amount of the other communication switching damper 146b, respectively, the blowing rate and temperature of air that is blown from the first vent blow-out port 106a through the second front passage 80a to the passenger's side in the front seats, and the blowing rate and temperature of air that is blown from the first vent blow-out port 106b through the second front passage 80b to the driver's side in the front seats, can be controlled separately from each other.

The third rear passage 148 facing the heater core 20 is formed on the downstream side of the second rear passages 142a, 142b. One side of the third rear passage 148 opens onto the heater core 20, whereas another side thereof opens onto the side of an adjacent fourth rear passage 150. In addition, a second air mixing damper 152, which mixes at a predetermined mixing ratio the cool air and warm air supplied to the third rear passage 148, thereby producing mixed air, is disposed rotatably in the third rear passage 148. The second air mixing damper 152 switches the communication state between the third rear passage 148 and the upstream or downstream side of the fourth rear passage 150, which is connected to the downstream side of the heater core 20. Consequently, air cooled by the evaporator 18 and supplied to the third rear passage 148, and air heated by the heater core 20 and that flows to the fourth rear passage 150, are mixed at a predetermined mixing ratio inside the fourth rear passage 150 by rotation of the second air mixing damper 152, and are blown out therefrom. Specifically, an intermediate location of the fourth rear passage 150 functions as a mixing section, for mixing cool air and warm air that is blown to the middle seats and rear seats in the vehicle.

The fourth rear passage 150 bends so as to circumvent the other end of the heater core 20 and extends to communicate with fifth and sixth rear passages 154, 156, which branch on a downstream side thereof. A rotatable mode switching damper 158 is disposed at the branching location of the fifth and sixth rear passages 154, 156. The communication state between the fourth rear passage 150 and the fifth and sixth rear passages 154, 156 is switched by rotation of the mode switching damper 158.

The fifth and sixth rear passages 154, 156 extend respectively in the rearward direction (the direction of arrow B) of the vehicle. The fifth rear passage 154 communicates with a second vent blow-out port (not shown) for blowing air in the vicinity of the faces of passengers in the middle seats in the vehicle. On the other hand, the sixth rear passage 156 communicates with third and fourth heat blow-out ports (not shown) for blowing air in the vicinity of the feet of passengers in the middle and rear seats.

More specifically, air supplied from the second blower unit 22 is introduced to the interior of the casing 12 through the second intake port 128, and under rotating actions of the second air mixing damper 152 and the mode switching damper 158, which make up the damper mechanism 24, the air passes through the first through sixth rear passages 130, 142a, 142b, 148, 150, 154, 156 and is supplied selectively to the second vent blow-out port, and the third and fourth heat blow-out ports (not shown), which are capable of blowing air to the middle and rear seats in the vehicle.

The aforementioned second through sixth front passages 80a, 80b, 82, 84, 96, 102, the bypass passage 88 and the second rear passages 142a, 142b are disposed respectively so as to straddle between the first divided casing 26 and the second divided casing 28. However, these passages also are divided by the center plate 30, which is disposed in the center of the casing 12.

The vehicular air conditioning apparatus 10 to which the heat exchanger according to the embodiment of the present invention is applied is basically constructed as described above. Next, operations and effects of the invention shall be explained.

First, when operation of the vehicular air conditioning apparatus 10 is started, the first blower fan 120 of the first blower unit 16 is rotated by supplying electrical power thereto, and air (interior or exterior air) that is taken in through the duct 116 or the like is supplied to the first front passage 34 of the casing 12 through the connection duct 14. Simultaneously, air (interior air), which is taken in by rotation of the second blower fan 138 of the second blower unit 22 by supplying electrical power thereto, is supplied to the first rear passage 130 from the blower case 140 while passing through the second intake port 128. In the following descriptions, air supplied to the interior of the casing 12 by the first blower fan 120 shall be referred to as "first air," and air supplied to the interior of the casing 12 by the second blower fan 138 shall be referred to as "second air."

The first air and the second air supplied to the interior of the casing 12 are each cooled by passing respectively through the first and second cooling sections 50, 52 of the evaporator 18, and flow respectively as chilled air to the second front passages 80a, 80b and the second rear passages 142a, 142b, in which the first and second air mixing dampers 86, 152 are disposed.

In the case that a vent mode, for example, is selected by a passenger for blowing air in the vicinity of the faces of passengers, the first air mixing damper 86 is rotated to an intermediate position between the third front passage 82 and the fourth front passage 84, whereupon the first air (cooled air) supplied to the third front passage 82 flows into the mixing section 98, and the first air supplied to the fourth front passage 84 is heated by passing through the heater core 20 to become heated air, and flows into the mixing section 98 through the fifth front passage 96, whereby the first cooled air and the first heated air are mixed together.

The first air (mixed air), which is made up of the cool air and heated air mixed in the mixing section 98, passes through the sixth front passage 102 and is blown in the vicinity of the faces of passengers in the front seats in the vehicle compartment from the first vent blow-out ports 106a, 106b, due to the fact that the defroster blow-out port 100 is blocked by the defroster damper 104, and further, the opening of the seventh front passage 110 is blocked by the vent damper 108.

On the other hand, the second air mixing damper 152 is rotated to an intermediate position in the interior of the third rear passage 148, whereupon the second air (cooled air) supplied to the third rear passage 148 is heated by passing through the heater core 20 to become heated air, and flows to the downstream side through the fourth rear passage 150. Together therewith, cooled second air is supplied directly into the fourth rear passage 150 from the opening of the third rear passage 148, is mixed together with the heated second air, and flows to the downstream side. In addition, under a switching action of the mode switching damper 158, the second air (mixed air) passes through the fifth rear passage 154 and is blown in the vicinity of the faces of passengers in the middle seats in the vehicle compartment from the second vent blow-out port (not shown).

Next, in the case that a bi-level mode is selected for blowing air in the vicinity of the faces and feet of passengers in the vehicle compartment, the first air mixing damper 86 is rotated somewhat toward the side of the third front passage 82, whereas the vent damper 108 is placed in an intermediate position, rotated somewhat to the side of the first vent blow-out ports 106a, 106b compared to the case of the vent mode. Additionally, the cooled first air that has passed through the evaporator 18 is supplied directly into the mixing section 98 via the bypass passage 88, is mixed in the mixing section 98 with the first air (mixed air) that is supplied through the third and fifth front passages 82, 96, and is blown in the vicinity of the faces of passengers from the first vent blow-out ports 106a, 106b. Further, a portion of the first air (mixed air), which flows to the sixth front passage 102 from the mixing section 98, passes through the sixth and seventh front passages 102, 110 and is supplied respectively to the first and second heat passages 112, 114, whereby the air is blown in the vicinity of the feet of passengers in the front and middle seats in the vehicle compartment from the first and second heat blow-out ports (not shown).

At the same time, the second air mixing damper 152 is rotated somewhat in a direction away from the heater core 20, and the mode switching damper 158 is rotated from the position closing the sixth rear passage 156 to an intermediate position between the fifth rear passage 154 and the sixth rear passage 156. In addition, as for the second air, heated air heated by the heater core 20 and cooled air, which is supplied to the fourth rear passage 150 through the opening from the third rear passage 148, are mixed together and blown as mixed air from the fifth rear passage 154, through the second vent blow-out port, and in the vicinity of the faces of passengers riding in the middle seats in the vehicle compartment, while also being blown from the sixth rear passage 156, past the third and fourth heat blow-out ports, and in the vicinity of the feet of passengers riding in the middle and rear seats in the vehicle compartment.

Next, in the case that the heat mode is selected for blowing air in the vicinity of the feet of passengers in the vehicle compartment, the first air mixing damper 86 is rotated further to the side of the third front passage 82 compared to the case of the bi-level mode, while the defroster damper 104 and the vent damper 108 are rotated respectively to block the defroster blow-out port 100 and the first vent blow-out ports 106a, 106b. Consequently, the first air (mixed air), which was mixed in the mixing section 98, passes through the sixth and seventh front passages 102, 110 and flows rearwardly to be supplied respectively to the first and second heat passages 112, 114, and is blown in the vicinity of the feet of passengers in the front and middle seats in the vehicle compartment from the non-illustrated first and second heat blow-out ports.

On the other hand, the second air mixing damper 152 is rotated further toward the side of the opening compared to the case of the bi-level mode, and further, the mode switching damper 158 is positioned to block the fifth rear passage 154. Consequently, the second air (mixed air), which is mixed in the fourth rear passage 150, passes from the fourth rear passage 150, through the sixth rear passage 156, and is supplied to the third and forth heat blow-out ports, whereby the air is blown in the vicinity of the feet of passengers in the middle and rear seats in the vehicle compartment.

Next, an explanation shall be made concerning a heat-defroster mode for blowing air in the vicinity of the feet of passengers in the vehicle compartment, as well as for blowing air in the vicinity of a front window for eliminating fog (condensation) from the front window. In the event that the heat-defroster mode is selected, the defroster damper 104 is rotated in a direction to separate from the defroster blow-out port 100, so as to assume an intermediate position between the defroster blow-out port 100 and the opening of the sixth front passage 102, and together therewith, the first vent blow-out ports 106a, 106b are blocked by the vent damper 108 (i.e., the condition of the two-dot-dash line shown in FIG. 2). Consequently, a portion of the first air (mixed air), which is mixed in the mixing section 98, passes through the defroster blow-out port 100 and is blown in the vicinity of the front window of the vehicle, while another portion of the first air flows past the sixth and seventh front passages 102, 110 and is blown in the vicinity of the feet of passengers in the front and middle seats in the vehicle compartment from the first and second heat passages 112, 114 and the first and second heat blow-out ports (not shown).

On the other hand, in the heat-defroster mode, in the case that the second air is blown toward the middle seats and rear seats of the vehicle compartment, since this mode is the same as the heat mode discussed above, detailed explanations thereof shall be omitted.

Lastly, the defroster mode for blowing air only in the vicinity of the front widow for eliminating fog (condensation) from the front window in the vehicle shall be described. In this case, the defroster damper 104 is rotated to separate from the defroster blow-out port 100 while the opening of the sixth front passage 102 is blocked, and the first air (mixed air) is supplied from the mixing section 98 to the opened defroster blow-out port 100 and is blown in the vicinity of the front window in the vehicle. In this case, the defroster mode can be handled solely by blowing first air supplied only from the first blower unit 16, without driving the second blower unit 22.

In the foregoing manner, according to the present invention, the evaporator 18 is equipped with the first cooling section 50 facing the first front passage 34 and through which air supplied from the first blower unit 16 passes, and the second cooling section 52 facing the first rear passage 130 and through which air supplied from the second blower unit 22 passes. The second fin 54, without any louvers provided therein, is disposed at the boundary portion C between the first cooling section 50 and the second cooling section 52, and is arranged between a pair of first and second tubes 36a, 36b, which are disposed in the vicinity of the boundary portion C.

Consequently, by providing the second fin 54 at the boundary portion C between the first cooling section 50 and the second cooling section 52, air that passes through the gaps 42 between the plurality of first tubes 36a and the second tubes 36b and flows inward toward the side of the second fin 54 is prevented by the second fin 54 from flowing through to the opposite side.

More specifically, air that flows in toward the side of the second fin 54 from the first cooling section 50 is blocked by the second fin 54, and therefore is prevented from flowing toward the side of the second cooling section 52. Conversely, air that flows in toward the side of the second fin 54 from the second cooling section 52 is blocked by the second fin 54, and therefore is prevented from flowing toward the side of the first cooling section 50.

In this manner, because leakage of air between the first cooling section 50 and the second cooling section 52 can reliably be blocked as the air passes between the first and second tubes 36a, 36b, air supplied from the first blower unit 16 can be made to pass through the first cooling section 50 of the evaporator 18 and flow toward the downstream side at a desired flow rate, whereas air supplied from the second blower unit 22 can be made to pass through the second cooling section 52 of the evaporator 18 and flow toward the downstream side at a desired flow rate. Thus, blowing of mixed air, which is adjusted in temperature respectively and independently, can be performed respectively and independently, with respect to the front seats, the middle seats, and the rear seats inside the vehicle compartment.

Further, for example, in the case that the second blower unit 22 is halted while only the first blower unit 16 is driven, air that is supplied to the first front passage 34 from the first blower unit 16 is prevented reliably by the second fin 54 from passing through the interior of the evaporator 18 and flowing toward the side of the first rear passage 130 and the second rear passages 142a, 142b, which are intended to be supplied with air from the second blower unit 22. Conversely, in the case that the first blower unit 16 is halted while only the second blower unit 22 is driven, air which is supplied to the first rear passage 130 by the second blower unit 22 is prevented by the second fin 54 from passing through the interior of the evaporator 18 and flowing toward the side of the first front passage 34 and the second front passages 80a, 80b.

Owing thereto, blowing out of air mistakenly from blow out ports for which blowing of air has been halted can be prevented, and thus, an unpleasant sensation is not imparted by unintentional blowing of air to passengers in the vehicle.

Furthermore, on the evaporator 18, because the pair of seal members 56a, 56b are attached to the surfaces 18a, 18b confronting the first front passage 34 and the first rear passage 130 thereby covering the second fin 54, for example, when air that flows in toward the second fin 54 from the side of the first cooling section 50 or the second cooling section 52 passes in the thickness direction of the evaporator 18 along the second fin 54, leakage of air to the exterior is reliably prevented by the seal members 56a, 56b, which are disposed on the surfaces 18a, 18b.

As a result, air from the first front passage 74 and the first rear passage 130 and which has flowed into the first and second cooling sections 50, 52 of the evaporator 18 can be made to flow reliably at a desired flow rate into the second front passages 80a, 80b and the second rear passages 142a, 142b.

Further, in the aforementioned embodiment, a structure has been described in which, when the first cooling section 50 and the second cooling section 52 of the surfaces 18a, 18b are partitioned from each other, the second fin 54, which is not equipped with louvers 40 therein, is disposed at the boundary portion C between the first cooling section 50 and the second cooling section 52. However, for example, a similar structure for partitioning the first heating section 92 and the second heating section 94 from each other in the heater core 20 may also be used.

The heat exchanger for use in a vehicular air conditioning apparatus according to the present invention is not limited to the above-described embodiment, and it is a matter of course that various modified or additional structures could be adopted without deviating from the essence and gist of the invention.

What is claimed is:

1. A heat exchanger for use in a vehicular air conditioning apparatus having a casing including a plurality of passages therein through which air flows, and a damper mechanism for switching a flow state of the air in the passages, wherein the heat exchanger is disposed in the interior of the casing and performs temperature adjustment by carrying out heat exchange on the air to be supplied therefrom, the heat exchanger comprising:

a plurality of first tubes, which are disposed upstream of the heat exchanger with respect to a direction of flow of the air that flows through the interior of the casing, the first tube extending along a width direction that is perpendicular to the direction of flow of the air, a medium flowing through the interior of the first tubes;

a plurality of second tubes, which are disposed downstream of the first tubes with respect to the direction of flow of the air, the medium flowing through the interior of the second tubes;

first fins disposed between the first tubes adjacent to each other and between the second tubes adjacent to each other, the first fins being bent in an undulating shape in their cross sections and having air holes therein through which the air flows; and partitioning means which is arranged along a direction in which the first and second tubes extend respectively, between the first and second tubes, the partitioning means effecting separation between a first heat exchange section and a second heat exchange section in said heat exchanger, the first heat exchange section carrying out heat exchange on the air that flows through a first passage of the casing, and the second heat exchange section carrying out heat exchange on the air that flows through a second passage of the casing, wherein the partitioning means is disposed at a boundary portion between the first heat exchange section and the second heat exchange section, and is made up of a second fin that has the same cross-sectional shape as the first fins and does not include the air holes therein, the partitioning means blocks air communications between the first heat exchanger section and the second heat exchanger section.

2. The heat exchanger according to claim 1, wherein a sealing member, which is attached to ends of the first and second tubes, is disposed at the boundary portion facing toward the second fin.

3. The heat exchanger according to claim 2, wherein the heat exchanger comprises an evaporator that cools the air, and that supplies cooled air.

4. The heat exchanger according to claim 2, wherein the heat exchanger comprises a heater core that heats the air, and that supplies warmed air.

5. The heat exchanger according to claim 1, wherein a gap having a predetermined size is formed between the first and second tubes, and the second fin blocks air communications between the first heat exchanger section and the second heat exchanger section through the gap.

6. A heat exchanger for use in a vehicular air conditioning apparatus having a casing including a plurality of passages therein through which air flows, and a damper mechanism for switching a flow state of the air in the passages, wherein the heat exchanger is disposed in the interior of the casing and performs temperature adjustment by carrying out heat exchange on the air to be supplied therefrom, the heat exchanger comprising:

a plurality of first tubes, which are disposed upstream of the heat exchanger with respect to a direction of flow of the air that flows through the interior of the casing, the first tube extending along a width direction that is perpendicular to the direction of flow of the air, a medium flowing through the interior of the first tubes, a plurality of second tubes, which are disposed downstream of the first tubes with respect to the direction of flow of the air with a gap between the first tubes and the second tubes, the medium flowing through the interior of the second tubes;

a first tank and a second tank respectively disposed at ends of the plurality of the first and second tubes and in parallel to each other;

first fins disposed between the first tubes adjacent to each other and between the second tubes adjacent to each other, the first fins having an undulating shape in a cross-section parallel to the first and second tubes and having air holes therein through which the air flows;

partitioning means which is arranged along a direction in which the first and second tubes extend respectively, between the first and second tubes, the partitioning means effecting separation between a first heat exchange section and a second heat exchange section in said heat exchanger, the first heat exchange section carrying out heat exchange on the air that flows through a first passage of the casing, and the second heat exchange section carrying out heat exchange on the air that flows through a second passage of the casing; and a pair of sealing members respectively disposed on two first tubes and two second tubes at the boundary portion between the first heat exchange section and the second heat exchange section, the sealing members sealing spaces surrounded by the first and second tanks, the two first tubes, and the two second tubes, wherein the partitioning means is disposed at a boundary portion between the first heat exchange section and the second heat exchange section, and is made up of a second fin that has the same cross-sectional shape as the first fins and does not include the air holes therein, the partitioning means blocks air communications between the first heat exchanger section and the second heat exchanger section.

7. The heat exchanger according to claim 6, wherein the pair of sealing members is respectively disposed on the two first tubes and the two second tubes at the boundary portion between the first heat exchange section and the second heat exchange section, the sealing members sealing the spaces surrounded by the first and second tanks, the two first tubes, and the two second tubes so that air does not flow through the spaces.

8. The heat exchanger according to claim 6, wherein the heat exchanger is an evaporator that cools the air, and that supplies cooled air.

9. The heat exchanger according to claim 6, wherein the heat exchanger is a heater core that heats the air, and that supplies warmed air.

10. The heat exchanger according to claim 6, wherein the pair of the sealing members is made of rubber or resin material.

* * * * *